J. M. STEBBINS.
Grain Drill.
No. 45,533.
2 Sheets—Sheet 2.
Patented Dec. 20, 1864.
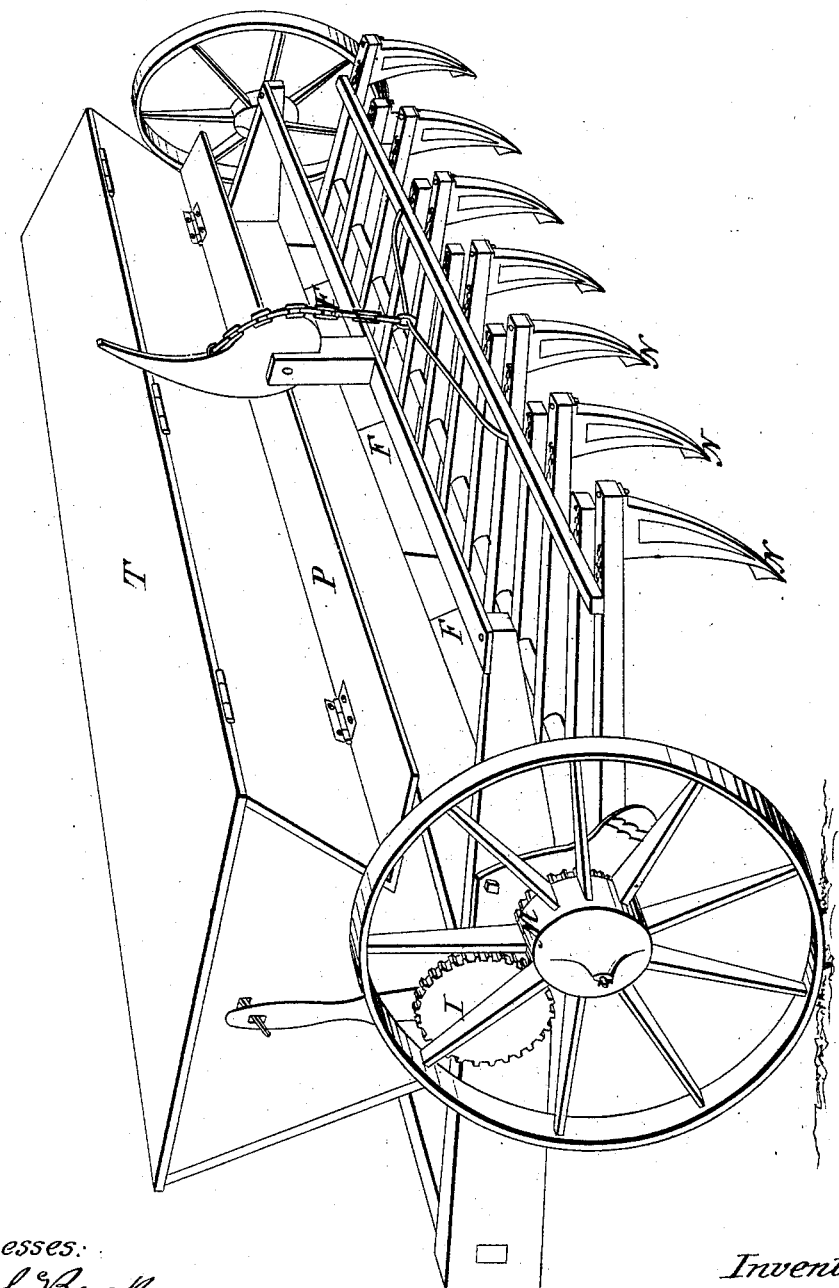
Witnesses:
J. S. Buck
Jno. S. Lister
Inventor:
Julius M. Stebbins

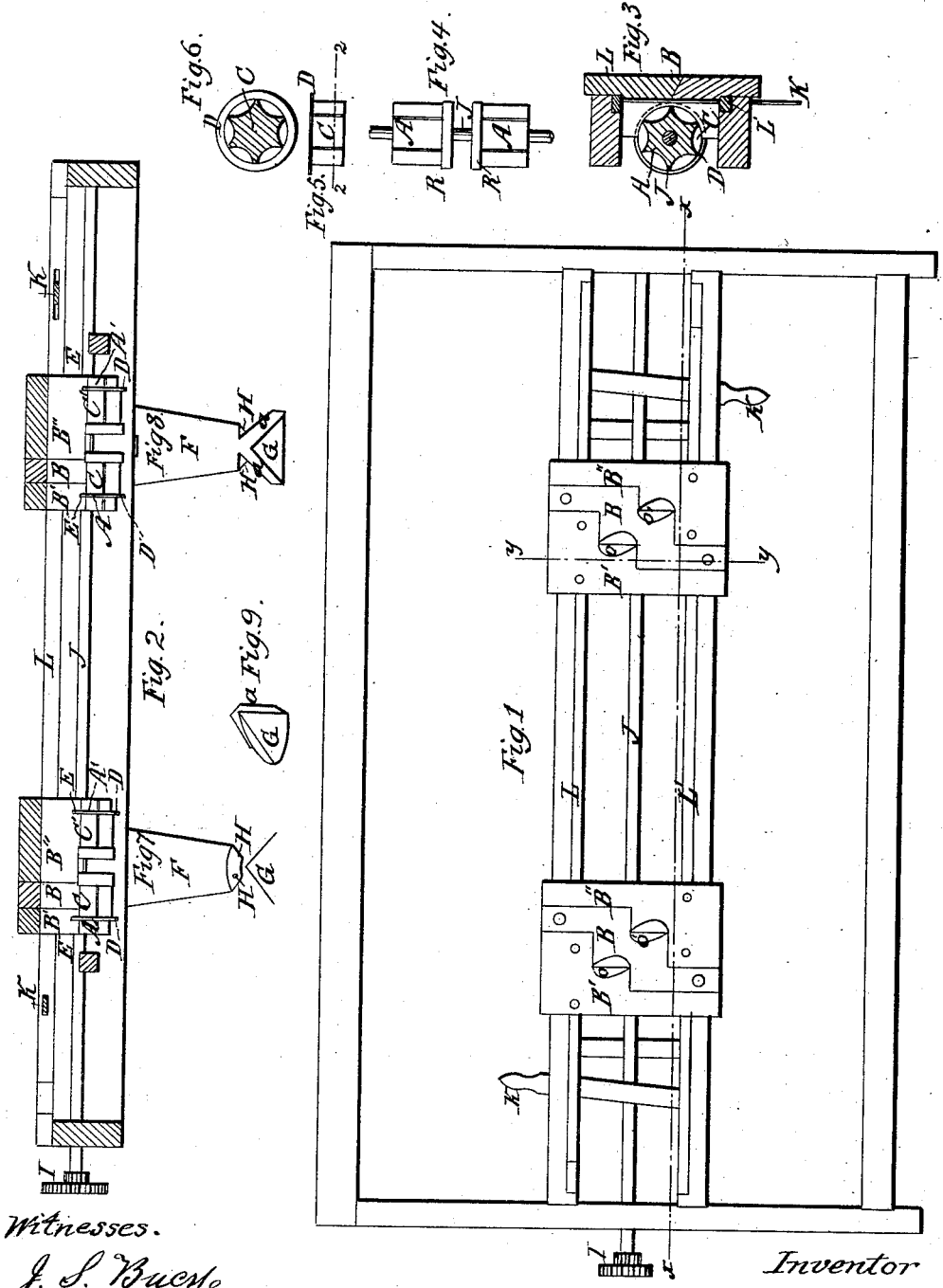

UNITED STATES PATENT OFFICE.

JULIUS M. STEBBINS, OF APPLETON, WISCONSIN.

IMPROVEMENT IN SEEDING-MACHINES.

Specification forming part of Letters Patent No. 45,533, dated December 20, 1864.

*To all whom it may concern:*

Be it known that I, JULIUS M. STEBBINS, of the city of Appleton, county of Outagamie, in the State of Wisconsin, have invented a new and Improved Seed-Sower, of which the following is a description, reference being had to the accompanying drawings, and to the letters of reference marked thereon, the same being a part of this specification, in which—

Plate I represents a general view of the machine in perspective, showing the rear and left end. T represents the hopper or large seed-box, and P the box for the grass or other small seeds that are to be sown. I is a pinion attached to the end of the shaft which revolves the cylinders, which gage the discharge of the seed from either or both seed-boxes at the same time. This pinion meshes into cogs on the inside of the wheel-hub M. F F represent the scatterers, and N N the cultivators, which pulverize the ground and drag in the seed.

Plate II represents the parts of the machine more particularly to be described in this specification, where Figure 1 represents the frame-work of the body part of the machine in its horizontal position; B B, the caps which cover the gaging-cylinders, and J the shaft which revolves said cylinders. L is a slide, to which the parts of the caps B' B' are connected; L', another slide, to which the parts of the caps B'' B'' are attached; and K K' are levers for moving the slides L and L', respectively. Fig. 2 is a vertical section of Fig. 1 through the dotted line *x x*, showing the location of the gaging-cylinders A A' and the sliding rings C C', also the funnels F F and scatterers G G. Fig. 3 is a vertical cross-section of part of Fig. 1 through the dotted line *y y*. Fig. 4 is a representation of the gaging-cylinders A and A', showing one of each of the series of cylinders and their relative positions on the shaft J. Fig. 5 is a side view of sliding rings C and C', and Fig. 6 is a vertical section of Fig. 5 through the dotted line *z z*. Fig. 7 is a vertical section of Fig. 8; and Fig. 8 is a representation of funnels F F, which receive the seeds to be sown from the gaging-cylinders and conduct them onto the scatterers G G. Fig. 9 is a perspective view of the scatterers G G.

On these drawings similar letters indicate corresponding parts.

This invention consists, in part, in the arrangement of two series of cylinders, A and A', each provided with buckets or chambers for gaging the discharge of two kinds of seed, and broadcast-sowing the same at the same time, both seeds (for instance, grain or grass) being gaged separately and independently of each other, both series of cylinders being attached to and revolved by one shaft, J. Over each pair of these cylinders is a cap, B, with orifices O and O' for the grain and other seeds to pass through into the chambers of the cylinders. These orifices O and O', as represented in Fig. 1, Plate I, are entirely closed; but when the end of the lever K is moved to the left it carries the slide L, and with it all the parts of the caps B' and B', and thus opens the orifices O and O of all the caps at once, and moving the handle of lever K' to the right in the same manner opens the orifices O' O'. These caps form part of the bottom of both seed-boxes when the machine is in use, and are arranged so that all the openings O and O have connection with one box and the orifices O' O' with the other.

To regulate the amount of seed to be sown on a given area of ground, the cylinders A A' are provided each with a sliding ring, as seen in Figs. 5 and 6 of Plate II, which is so constructed as to fit into the chambers or buckets of the cylinders, so that when moved back or forward the capacity of the chambers is increased or diminished at will. These rings are moved by flanges D D, which work in grooves E E, in the under side of the parts of the caps B' and B'', as seen in Fig. 2, so that when these parts of the caps are moved to the right or left, as before described, the rings are carried with them. By this arrangement all the cylinders of either series are gaged at one and the same time and independently of the others.

The importance of this invention, more especially to the agricultural interests of the West, consists in the fact that our farmers, who have mostly ignored the importance of "rotation of crops," are now seeing the importance of it, and are "seeding down" more or less of their large fields every year. This is greatly facilitated by the use of this machine, with which both grass and grain can be sown at the same time and each gaged separately. (Seeding down is almost invariably accomplished by sowing grass-seed with the last crop of grain next preceding the first crop of grass.) The importance of this separate gaging of the discharge of the two kinds of seeds arises from the fact that when seeds of different sizes are mixed in one receptacle (as in the hopper of a seed-sower) the shaking caused by motion of the machine when in operation will cause the smaller seed to settle to the bottom and be sown out before the larger, otherwise one box or hopper and one series of cylinders only would be necessary.

I do not claim originality in the use of cylinders for gaging the discharge of grain from a hopper, but do claim an important combination. These cylinders are sometimes so constructed as to admit of but a very limited range of gage in the capacity of the chambers, so that when enlarged to their greatest capacity, as would be required for sowing some kinds of grain, (for instance, oats,) and the velocity of the revolving shaft regulated accordingly, then they could not be reduced in extent sufficiently for sowing other kinds of grain, such as wheat or buckwheat. Mine are so constructed as to admit of closing the chambers of the cylinders of each series entirely, as represented in the drawings, and then opening them to any extent required, as described in this specification.

Since the distance between the points R and R', Plate II, Fig. 4, must be at least as great as the distance to which the sliding rings C and C', Fig. 2, are to be moved to the right or left in regulating the chambers of the cylinders to their greatest capacity for sowing any kind of grain, the cylinders A and A' may be made separately, and disconnected one from the other, as represented in Figs. 2 and 4; or, if the saving of metal be no object, (being usually made of cast-iron,) they may be united at their base, still keeping the points R and R' at proper distance from each other.

The caps B B are peculiarly constructed, being in three parts, the middle piece being attached to the machine so it cannot move to the right or left, while the parts B' and B'' are attached to the slides L and L', respectively, by means of which they are moved to the left and right, thus opening the orifices O and O', as described. By this arrangement, no part of the revolving cylinders is exposed to the grain, except the buckets into which it falls, thus overcoming a serious objection to the use of caps with their orifices permanently opened to their greatest capacity, which leaves a part of the cylinders, when their chambers are reduced to any extent less than their greatest capacity for sowing, to come in contact with a portion of the seed which does not immediately fall into the buckets, by which means a portion of the grain is quite liable to be injured by the motion of the cylinders grinding it against the edges of the orifices. Again, the parts B' and B'' of the caps having grooves E E in the under side, in which the flanges D D of the sliding rings C C' work, afford a very simple and perfect device for sliding the rings, and thereby accurately gaging the capacity of the machine for sowing various kinds of grain and seeds. But one of the most important features of this invention is the arrangement of the scatterers G G, whereby seeds are spread uniformly on any tillable ground, be it ever so uneven. This is accomplished by the beveled flange H H, which is turned inward at the bottom of the funnel. This flange does not extend entirely around the throat of the funnel, but is cut short just each side of the peak of the semicone scatterer G. The flange is represented at H H, Figs. 7 and 8. Without this or some other equivalent device while sowing on a hillside, or if one side of the machine be elevated higher than the other by any means, the seed would fall unevenly upon one side of the scatterer and be sown in streaks, instead of a uniform broadcast; but by this arrangement a portion of the seed which is falling thus upon one side of the scatterer comes in contact with the flange H H and is thrown to the opposite side of the cone, (or whatever device is used for scattering,) thereby securing a uniform spreading of the seeds upon any ground.

The perfect funnel or cylinder F (which is a part of the scatterer) has important advantages over any tube or other device for conveying seeds to the scatterer proper, which is open on one or more sides, because in windy weather it protects the seed until it reaches the lowest part of the scatterer near the ground, so that sowing can be done in quite rough weather. It also affords at least two points at which it may be attached to the frame-work of the machine, which is much more permanent than that of any open tube or conductor which can be attached at but one point, and hence very liable to be shaken or broken off when coming in contact with even very slight obstructions; but I do not claim the use of a funnel or cylinder, F, as here described, except in combination with the flange H H.

What I do claim as my invention, and desire to secure by Letters Patent, is—

1. The use of two series of cylinders, A A', revolved upon a single shaft, J, with sliding rings C C', operating as and for the purpose set forth.

2. The double extension or dividing-cap B, with two orifices, O and O', substantially as described, also its use in combination with revolving cylinders for gaging the discharge of two or more kinds of seed at the same time.

3. The use of a beveled flange, H H, when used substantially as and for the purpose set forth, also its use in combination with a funnel or cylinder, substantially as described.

JULIUS M. STEBBINS.

Witnesses:
J. S. BUCK,
JNO. S. LUTER.